United States Patent
Dong et al.

(10) Patent No.: US 10,524,411 B2
(45) Date of Patent: Jan. 7, 2020

(54) HIGH-SPEED TRANSPLANTING MECHANISM

(71) Applicant: Jiangsu University, Zhenjiang County, Jiangsu (CN)

(72) Inventors: Lili Dong, Jiangsu (CN); Lvhua Han, Jiangsu (CN); Zhen Wang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 187 days.

(21) Appl. No.: 15/870,097

(22) Filed: Jan. 12, 2018

(65) Prior Publication Data

US 2018/0132416 A1 May 17, 2018

Related U.S. Application Data

(63) Continuation of application No. PCT/CN2016/082441, filed on May 18, 2016.

(30) Foreign Application Priority Data

Jan. 7, 2016 (CN) .......................... 2016 1 0009880

(51) Int. Cl.
*A01C 11/02* (2006.01)
(52) U.S. Cl.
CPC .................................... *A01C 11/02* (2013.01)
(58) Field of Classification Search
CPC ............................... A01C 11/02; A01C 11/00
See application file for complete search history.

(56) References Cited

U.S. PATENT DOCUMENTS 3,943,863 A * 3/1976 Leonard ................. A01C 5/045
111/115
4,067,268 A * 1/1978 Lofgren ................. A01C 11/00
111/115

(Continued)

FOREIGN PATENT DOCUMENTS

| CN | 2696294 Y | 5/2005 |
| CN | 101379910 A | 3/2009 |

(Continued)

OTHER PUBLICATIONS

PCT International Search Report, PCT/CN2016/082441, dated Oct. 14, 2016 with English translation.

(Continued)

*Primary Examiner* — Jamie L McGowan
(74) *Attorney, Agent, or Firm* — TraskBritt

(57) ABSTRACT

Described is a high-speed transplanting mechanism that includes an angle-adjusting device about an angle of a duckbill entering soil, the mechanism comprising a rear arm, a front arm, a restoring spring, a control wire, a control wire sleeve and a control adjuster. The front arm is hinged on the mounting base of the planting device, the rear arm is hinged on the duckbill planting device, and the another end of the rear arm and the front arm are axial sliding connection. The control adjuster comprises an adjuster body and a handle fixed on the adjuster body. The restoring spring is positioned between the first limit plate on the rear arm and the second limit plate on the front arm. The end of the control wire is fixed on the second limit plate and, in turn, the other end of the control wire passes through the first limit plate, the restoring spring, the second limit plate and the control wire sleeve, and finally fixed to the adjuster body. The angle of the duckbill into the soil can be adjusted by tightening or loosening the control wire. The pot seedling can be supported and pushed upright by the forward inertia force as the (Continued)

wheel turns the soil, breaking through the theory of zero-velocity seedling transplanting. The planting pot seedling speed of the disclosed mechanism is more than 60 seedlings per minute, and the quality and efficiency of planting pot seedlings are improved.

16 Claims, 2 Drawing Sheets

(56) References Cited

U.S. PATENT DOCUMENTS

| | | | | |
|---|---|---|---|---|
| 4,132,337 | A | * | 1/1979 | Masuda ................. A01C 11/02 225/5 |
| 4,167,911 | A | * | 9/1979 | Masuda ................. A01C 11/02 111/105 |
| 4,290,373 | A | * | 9/1981 | Boots .................... A01C 11/02 111/103 |
| 4,305,337 | A | * | 12/1981 | Centofanti ............. A01C 11/02 111/107 |
| 4,807,543 | A | * | 2/1989 | Paul ....................... A01C 5/04 111/100 |
| 5,224,554 | A | * | 7/1993 | Poll ........................ A01C 11/02 111/149 |

FOREIGN PATENT DOCUMENTS

| | | | |
|---|---|---|---|
| CN | 101715670 | A | 6/2010 |
| CN | 101999268 | A | 4/2011 |
| CN | 102823365 | A | 12/2012 |
| CN | 103609238 | A | 3/2014 |
| CN | 104919952 | A | 9/2015 |
| EP | 260700 | A2 | 3/1988 |
| WO | 2017117893 | A1 | 7/2017 |
| WO | WO-2018021720 | A1 * | 2/2018 ............. A01C 11/02 |

OTHER PUBLICATIONS

PCT International Written Opinion, PCT/CN2016/082441, dated Oct. 14, 2016.

\* cited by examiner

HIGH-SPEED TRANSPLANTING MECHANISM

CROSS-REFERENCE TO RELATED APPLICATIONS

This application is continuation of co-pending International Patent Application PCT/CN2016/082441, filed May 18, 2016, designating the United States of America and published as International Patent Publication WO 2017/117893 A1 on Jul. 13, 2017, which claims the benefit under Article 8 of the Patent Cooperation Treaty to Chinese Patent Application Serial No. 201610009880.8, filed Jan. 7, 2016, the contents of the entirety of each of which is incorporated herein by this reference.

TECHNICAL FIELD

This application relates to a high-speed transplanting mechanism for a transplanter, in particular, a high-speed planting mechanism that is mainly applied to a transplanter and relates to the technical field of agricultural machinery.

BACKGROUND

Compared with a conventional direct seeding manner, pot seedling transplantation has the following major advantages: growth periods of vegetables can be shortened, crop arrangement is facilitated, land utilization is improved, and economic income is increased. A transplanted pot seedling has a strong root system and consistent flowering and maturation, which can facilitate subsequent stages, such as management and harvesting. Therefore, pot seedling cultivation and pot seedling transplanting have become increasingly popular among vegetable producers and flower producers. However, due to the lack of suitable auxiliary machines, pot seedling cultivation and transplanting have been labor-intensive industries for a long time, where the labor cost accounts for over 50% of the total production cost. Manual transplanting has high labor intensity, low work efficiency, and low transplanting quality, so that large-area transplantation can hardly be implemented. Consequently, the production scale is small, the production efficiency is low, and the development of related crop production in China is restricted. The transplanter not only can greatly reduce the labor intensity and the production cost, improve the work efficiency, transplanting quality and the survival rate of the pot seedling, but also improve the economic and social benefits. Therefore, there is an urgent need for the development of a system that implements the mechanization of pot seedling transplanting work.

The planting system is the core system of the transplanter. The planting system is used to plant the pot seedling into soil by a duckbill with better planting quality; the pot seedling comes from the pot seedling distributor or the artificial work. Most vegetable crops need to keep the perpendicularity of the planting pot seedling, and it is necessary to ensure the velocity of the relative rest. The theory of zero-speed seedling transplanting is to create a moment of relatively static state for each planting pot seedling in the case of continuous movement of the transplanter, in order to complete the planting under the still upright state of the pot seedling. Therefore, in the process of planting a pot seedling, the forward speed of the transplanter is equal to the horizontal velocity of the pot seedling planting moment and the opposite direction, so that the instantaneous absolute velocity of the pot seedling planting moment is zero. The pot seedling is stationary relative to the ground at this point, while the pot seedling is planted into the soil by the planting mechanism. The soil is then overlaid to complete the planting process. At present, the transplanter has a slow planting speed under the restriction of "zero speed seedling transplanting," the planting speed is usually about 40 pot seedlings per minute.

A straight line planting device for a transplanter was disclosed in Chinese patent publication CN101715670A, including a transmission device, a planting device, a control mechanism and a rack, which are used to drill the hole, form the hole and plant the pot seedling. The transmission device comprises sprocket wheels, a gear, a shaft and a crank link mechanism, where the crank link mechanism is composed of a crank, a connecting rod, a push rod, a rack and bearings. The control mechanism is composed of a stop lever, a positioning plate, a right connecting rod and a left connecting rod, and the bracket is fixed on the rack by bolt connection. The driving power of the crank link mechanism is driven by sprocket, gear and shaft, and the reciprocating linear motion of the planting device is achieved by the motion of the crank link mechanism. The planting device is in a closed state when it moves to the top dead center. The pot seedling is put into the planting device by the seedling feeding device, while the planting device drills into the soil near the lower dead center. The planting device is opened under the action of the control mechanism, the pot seedling is put into the hole in the soil, and the planting operation is completed. Then, the planting device is moved upward, the planting device is closed under the action of the control mechanism when it reaches a certain height, and the next working cycle begins. The planting device makes reciprocating rectilinear movement in the process of working, which improves the efficiency and reliability of a transplanter. However, the straight-line planting device has a velocity in the horizontal direction because it is moving forward with the transplanter. The inertia will cause the planting device to produce a scraping to the planted seedlings and, in this way, the planting seedling is not upright, maybe even inverted, and the quality of transplanting is reduced. In addition, this scraping is also not conducive to the pot seedling growth.

In order to prevent injury and scraping of the pot seedling caused by the horizontal velocity of the planting device, a kind of planting mechanism for a dry land transplanter is disclosed in Chinese Patent Publication CN101999268A, which includes a planetary carrier, a center wheel, a planetary wheel I, a planetary wheel II, a connecting rod I, a connecting rod II, rollers, a groove cam, and a duckbill planting device. By controlling the parameters of planetary gear ratio, CAM groove, planetary carrier, connecting rod length and difference of connecting rod length, the track of planting seedlings, receiving, carrying, punching, and planting suitable for a duckbill planting device can be obtained. The seedlings planted by the planting mechanism designed by the track are well upright and can avoid injury and scraping of the seedling. Unfortunately, the structure of this planting mechanism is complicated. The seedling upright degree can be guaranteed when the relative velocity of the duckbill planting device and the ground are zero. In particular, this planting mechanism has a slow planting speed and low work efficiency.

BRIEF SUMMARY

In view of the technical deficiencies and defects in existing transplanters, described is a high-speed transplanting mechanism that includes an angle-adjusting device for the angle of a duckbill entering the soil. The device can adjust and keep the duckbill and forward dip angle with the ground during planting a seedling. The pot seedlings are not upright, but slightly backward at the planting moment. The forward inertia impulse of the seedling itself with the high speed transplanter will pick up the slightly backward seedling a little, making the pot seedlings upright under the action of the wheel as it turns the soil. That is, the forward tilting duckbill is offset by the forward inertia impulse caused by its fast forward velocity, so that the seedlings will stand upright, and this breaks through the theory of zero-velocity seedling transplanting. A planting mechanism suitable for a high-speed transplanter is provided in this disclosure as it plants more than 60 seedlings per minute and can solve the problem of slow planting speed, low upright degree and low planting quality, and it can improve the planting quality and efficiency of a transplanter.

The technical solutions of this disclosure are preferably as follows: a high-speed transplanting mechanism that includes a power input parts, a "driving shaft" (or drive shaft), a rocker, a connecting rod, a planting power arm, an angle-adjusting device about the angle of a duckbill entering the soil, a duckbill planting parts, a pot seedling upright-keeping unit, and a mounting base of the planting device. The end of the drive shaft is connected to the power input parts, the other end of the drive shaft is fixed at the end of the rocker, and the other end of the rocker is hinged with the middle of the planting power arm. The end of the planting power arm is hinged with the duckbill planting parts, and the other end of the planting power arm is hinged with the mounting base of the planting device. The pot seedling upright unit is installed on the transplanter. The angle-adjusting device about the angle of a duckbill while entering the soil comprises a rear arm, a front arm, a restoring spring, a control wire, a control wire sleeve and a control adjuster. The first control wire hole is located on the first limit plate, and the first limit plate is located on the rear arm. The second control wire hole is located on the second limit plate, and the second limit plate is located on the front arm. The end of the front arm is hinged with the mounting base of the planting device, the end of the rear arm is hinged with the duckbill planting parts, and the other end of the front arm and the other end of the rear arm are axial sliding connections. The control adjuster includes the adjuster body and the handle fixed on the adjuster body. The adjuster body is fixed on the mounting base of the planting device or the duckbill planting parts by the screw, and it has many circular holes that are evenly distributed in circumference. The mounting base of the planting device or the duckbill planting parts is provided with a raised cylindrical platform that can be embedded into the circular holes in the adjuster body. The restoring spring is positioned between the first limit plate and the second limit plate. The end of the control wire is fixed on the second limit plate and, in turn, the other end of the control wire passes through the first control wire hole, the restoring spring, the second control wire hole and the control wire sleeve. Finally, it is fixed on the adjuster body.

Preferably, the angle-adjusting device about the angle of a duckbill entering soil can drive the duckbill to incline to the direction opposite to the driving direction of the transplanter, the angle between the ground and the center line of the duckbill can be adjusted at 75°-85°.

Preferably, an extension is respectively set at one end of the rear arm and the front arm, and the two extension parts can be connected by sliding fit.

Preferably, a sliding adjusting groove is provided at one end of the rear arm connected to the front arm, a guide pin shaft is provided at one end of the front arm connected to the rear arm, and the guide pin shaft is inserted into the sliding adjusting groove.

Preferably, the extension part of the front arm has a counter bore that corresponds to the section shape of the extension part section of the rear arm. The extension part of the rear arm is inserted into the counter bore, and the two sides of the counter bore are the sliding guide fit.

Preferably, there are some ball bearings between the extension of the rear arm and the counter bore.

Preferably, the adjuster body is provided with a scale.

Preferably, an angle scale plate is set on one side of the duckbill planting parts.

The high-speed transplanting mechanism according to this disclosure is mainly used for the dig-holes planting device. There is an angle-adjusting device about the angle of a duckbill entering the soil. The angle of the duckbill into the soil is adjusted by the adjuster tighten or loosen control line. Then, the duckbill has an inclination angle between the opposite direction of the transplanting machine and the vertical direction, causing the pot seedlings to be tilted in the opposite direction of the transplanter when it is implanted. The pot seedlings in the duckbill are the same horizontal velocity as the transplanter during the planting process; that is, the pot seedling will have the same speed as the transplanter in the moment of transplanting. Thus, the backward tilting pot seedlings will be offset by the inertia of the forward velocity, and the pot seedlings will be upright under the action of the wheel as it turns the soil. The high-speed transplanting mechanism overcomes the current problems of slow transplanting speed and the bad upright degree, and improves the planting quality of pot seedlings.

At the same time, the high-speed transplanting mechanism according to this disclosure makes the pot seedling stand up by the forward inertial force as the wheel turns the soil, breaking through the theory of zero-velocity seedling transplanting, improving the planting efficiency. The speed of planting pot seedlings is more than 60 seedlings per minute, and the opened duckbill to the pot seedlings will be damaged by the opening and closing duckbill and the inertia impulse of the transplanter when pot seedlings are planting. Therefore, the high-speed transplanting mechanism of this disclosure has improved the quality of planting pot seedlings and provided supports for the research and development of a high-speed transplanter.

Figure 1:
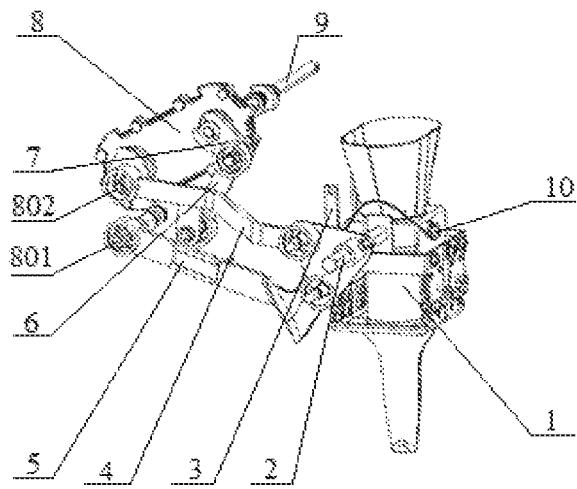
FIG. 1: Schematic structure view of the high-speed transplanting mechanism according to this disclosure.

In the drawings:
 1. duckbill planting parts;
 2. lateral adjustment rod;
 3. duckbill opening and closing control part;
 4. planting power arm;
 5. angle-adjusting device for the angle of a duckbill entering the soil;
 6. connecting rod;
 7. rocker;
 8. mounting base of the planting device;

9. drive shaft;
10. control adjuster;
51. rear arm;
52. guide pin shaft;
53. front arm;
54. control wire;
55. restoring spring;
56. control wire sleeve;
101. handle;
102. screw;
103. adjuster body;
511. first control wire hole;
512. slide adjustment groove;
513. rear arm rotating sleeve;
514. first limit plate;
531. second control wire hole;
532. guide pin shaft hole;
533. front arm rotating sleeve;
534. second limit plate;
801. adjustable arm support shaft; and
802. power arm support shaft.

DETAILED DESCRIPTION

The structure, functionality, and processing of this disclosure are further described below with reference to the accompanying drawings and the concrete implementation examples. However, the protective range of this disclosure includes, but is not limited to that.

The high-speed transplanting mechanism hereof includes the angle-adjusting device about the angle of a duckbill entering the soil. The angle-adjusting device can adjust the angle between the center line of the duckbill and the ground, making the duckbill have an inclination angle of the duckbill into the soil opposite that of the transplanter direction. The backward tilting seedlings, which are planted in a moment, are upright by the inertia of the forward velocity and the action of the wheel as it turns the soil. That is, the backward tilting pot seedlings will be offset by the inertia of the forward velocity, and the pot seedlings stay upright. The high-speed transplanting mechanism breaks through the theory of the zero-velocity seedling transplanting and can solve the problem of slow planting speed, low upright degree and low planting quality, and improve the planting quality of the pot seedling and the efficiency of the transplanter. A transplanting mechanism suitable for a high-speed transplanter is provided in this disclosure and its transplanting speed can be more than 60 seedlings per minute.

FIG. 1 is a schematic structural view of the high-speed transplanting mechanism in this disclosure. This mechanism includes a power input parts, a drive shaft 9, a rocker 7, a connecting rod 6, a planting power arm 4, an angle-adjusting device about the angle of a duckbill entering the soil 5, a duckbill planting parts 1, a pot seedling upright-keeping unit, and a mounting base of the planting device 8. The end of the drive shaft 9 is connected to the power input parts. The other end of the drive shaft 9 is fixed on the end of the rocker 7, and the other end of the rocker 7 is hinged with the middle of the planting power arm 4. The end of the planting power arm 4 is hinged with the duckbill planting parts 1, and the other end of the planting power arm 4 is hinged with the power arm support shaft 802 of the mounting base of the planting device 8. The pot seedling upright-keeping unit is installed on the transplanter.

Figure 2:
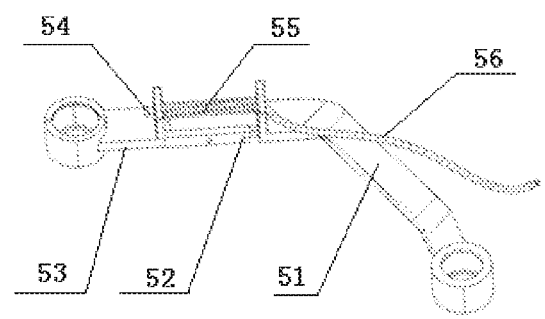
FIG. 2: Schematic structure view of the angle-adjusting device about the angle of a duckbill entering the soil.

FIG. 2 is a schematic structural view of the angle-adjusting device about the angle of the duckbill entering the soil 5. This device includes a rear arm 51, a front arm 53, a restoring spring 55, a control wire 54, a control wire sleeve 56 and a control adjuster 10. The front arm rotating sleeve 533 (see FIG. 4) is on one end of the front arm 53, and the front arm rotating sleeve 533 is hinged to the adjust arm supports shaft 801 on the mounting base of the planting device 8. The rear arm rotating sleeve 513 is on one end of the rear arm 51, and the rear arm rotating sleeve 513 is hinged to the duckbill planting parts 1. An extension is provided at one end of the rear arm 51 and the front arm 53, and the two extension parts can be connected by sliding assembly. The angle of the duckbill entering the soil is the angle of the duckbill planting parts 1 and the ground, the angle-adjusting device about the angle of the duckbill entering soil can drive the duckbill to incline to the direction opposite to the driving direction of the transplanter, and the adjustment of this angle can be adjusted at 65°-85° by adjusting the composition length of the front arm 53 and the rear arm 51. In particular, the adjustment of the composition length is achieved by the control wire 54 and the restoring spring 55.

Figure 3:
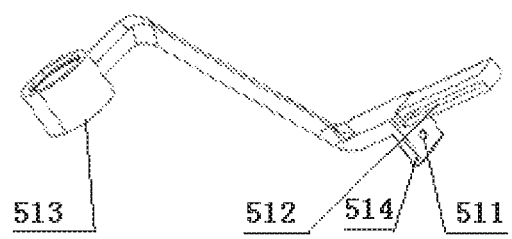
FIG. 3: Schematic structure view of the rear arm.
Figure 4:
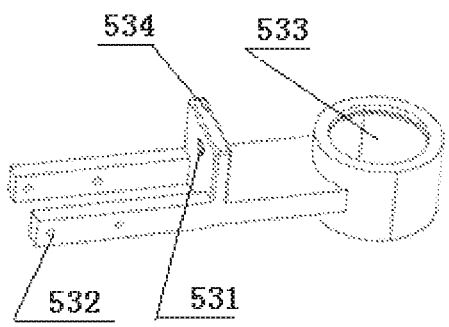
FIG. 4: Schematic structure view of the front arm.

As shown in FIGS. 2-4, a sliding adjusting groove is provided at one end of the rear arm 51 connected to the front arm 53, the guide pin shaft 52 is provided at one end of the front arm 53 connected to the rear arm 51, the guide pin shaft 52 is installed in the guide pin shaft hole 532, and the guide pin shaft 52 interference fits with the pin shaft hole 532. The guide pin shaft 52 is inserted into the slide adjustment groove 512, and the guide pin shaft 52 can slide into the slide adjustment groove 512 to play a guiding role. The first control wire hole 511 is located on the first limit plate 514, and the first limit plate 514 is located on the rear arm 51. The second control wire hole 531 is located on the second limit plate 534, and the second limit plate 534 is located on the front arm 53. The restoring spring 55 is positioned between the first limit plate 514 and the second limit plate 534. The end of the control wire 54 is fixed on the second limit plate 534 and, in turn, the other end of the control wire 54 passes through the first control wire hole 511, the restoring spring 55, the second control wire hole 531 and the control wire sleeve 56, and finally fixed on the adjuster body 103.

Figure 5:
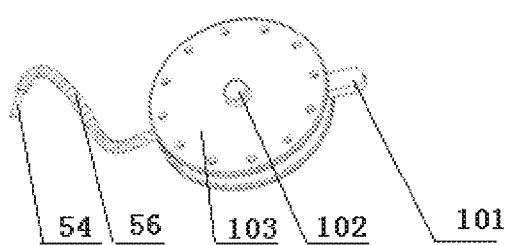
FIG. 5: Schematic structure view of the control adjuster.

FIG. 5 is a schematic structural view of the control adjuster 10. The control adjuster 10 is used to tighten or loosen control wire 54, including an adjuster body 103 and a handle 101 fixed on the adjuster body 103. The adjuster body 103 is fixed on the duckbill planting parts 1 by the screw 102. The adjuster body 103 has many circular holes that are evenly distributed in circumference. The raised cylindrical platform can be embedded into these circular holes. The process for use is as follows: first, the screw 102 for fixed adjuster body 103 is loosened; second, in order to turn the adjuster body 103 by the handle 101, tighten or loosen the control wire 54; third, the cooperation with the control wire sleeve 56 to adjust the angle of the duckbill entering the soil to make it suitable for duckbill planting parts; and, finally, the circular holes on the adjuster body 103 are mounted on the raised cylindrical platform on the duckbill planting parts 1, which can be used to fix the adjuster body 103 and tighten the screw 102 to prevent the adjuster body 103 from rotating.

In order to make the angle of the duckbill "getting into" (or entering) the soil more easily observed and/or adjusted, the angle scale plate is set on the side of the duckbill planting parts 1, or the scale is set on the adjuster body 103.

The power input parts can be driven by an electric motor or a fuel engine. The prime power of the fuel engine or the electric motor is inputted by the power input parts, then the drive shaft 9 turns the rocker 7, and drives the planting power arm 4 through the connecting rod 6, in turn, driving the duckbill planting parts 1 to move up and down. According to the information obtained from the rotary speed of duckbill planting parts 1 matching with the land wheel speed of the transplanter, the duckbill opens and closes by the duckbill opening and closing control part 3 to complete the transplanting of the pot seedling, and the transplanting of the pot seedling is consistent with its agronomic requirements. The lateral adjustment rod 2 is used for the installation and adjustment of the duckbill planting parts 1.

In addition, one end of the rear arm 51 and the front arm 53 are, respectively, set with an extending part, and the two extension parts can be connected by sliding fit. Specifically, there are many ways of assembling the extension parts. For example, the extending part of the front arm 53 has a counter bore that corresponds to the section shape of the extending part of the rear arm 51. The extending part of the rear arm 51 is inserted into the counter bore, and the two sides of the counter bore are the sliding guide fit. There are some ball bearings between the extending part of the rear arm 51 and the counter bore that can reduce the friction between the extension part of the rear arm 51 and the counter bore. The length of the adjustable arm can be easily adjusted.

The embodiments are preferred implementation manners of this disclosure. However, this disclosure includes, but is not limited to, the foregoing manners of implementation. Any obvious improvements, replacements or variations that can be made by a person skilled in the art without departing from the substantial content of this disclosure fall within the protection scope of the disclosure.

What is claimed is:

1. A high-speed transplanting mechanism, comprising:
power input parts,
a drive shaft,
a connecting rod,
a rocker,
a planting power arm,
an angle-adjusting device about an angle of a duckbill entering soil,
duckbill planting parts,
a pot seedling upright-keeping unit, and
a mounting base of the planting device
wherein the mounting base of the planting device has an adjustable arm support shaft and a power arm support shaft;
wherein one end of the drive shaft is connected to the power input parts, the other end of the drive shaft is fixed at one end of the rocker, and the other end of rocker is hinged with the middle of the planting power arm, the end of the planting power arm is hinged with the duckbill planting parts, and the other end of the planting power arm is hinged with the power arm support shaft on the mounting base of the planting device;
wherein the pot seedling upright-keeping unit is installed on the transplanter;
wherein the angle-adjusting device about the angle of a duckbill entering soil includes a rear arm, a front arm, a restoring spring, a control wire, a control wire sleeve and a control adjuster;
further comprising a first control wire hole located on a first limit plate, the first limit plate being located on the rear arm;
further comprising a second control wire hole located on a second limit plate, the second limit plate being located on the front arm;
wherein the front arm is hinged with an adjustable arm support shaft on the mounting base of the planting device, the end of the rear arm is hinged with the duckbill planting parts, the other end of the rear arm and the other end of the front arm are axial sliding connections;
wherein the control adjuster comprises an adjuster body and a handle fixed on the adjuster body;
wherein the adjuster body is fixed on the mounting base of the planting device or the duckbill planting parts by the screw, the adjuster body having many circular holes that are evenly distributed in circumference;
wherein the mounting base of the planting device or the duckbill planting parts is provided with a raised cylindrical platform that can be embedded into the circular holes in the adjuster body;
wherein the restoring spring is positioned between the first limit plate and the second limit plate, the end of the control wire being fixed to the second limit plate while, in turn, the other end of the control wire passes through the first control wire hole, the restoring spring, the second control wire hole and the control wire sleeve, finally being fixed to the adjuster body.

2. The high-speed transplanting mechanism of claim 1, wherein the angle-adjusting device about the angle of a duckbill entering the soil can drive the duckbill to incline to the direction opposite to the driving direction of the transplanter, the angle between the ground and the center line of the duckbill can be adjusted at 65°-85°.

3. The high-speed transplanting mechanism of claim 1, wherein an extension is respectively set at one end of the rear arm and the front arm, and two extension parts can be connected by sliding fit.

4. The high-speed transplanting mechanism of claim 1, wherein a slide adjusting groove is provided at one end of the rear arm connected to the front arm, a guide pin shaft at one end of the front arm connected to the rear arm, and the guide pin shaft is inserted into the slide adjusting groove.

5. The high-speed transplanting mechanism of claim 3, wherein the extension part of the front arm has a counter bore that corresponds to the section shape of the extension part of the rear arm, the extension part of the rear arm is inserted into the counter bore, and the two sides of the counter bore are the sliding guide fit.

6. The high-speed transplanting mechanism of claim 5, wherein some ball bearings are between the extension part of the rear arm and the counter bore.

7. The high-speed transplanting mechanism of claim 1, wherein the adjuster body is provided with a scale.

8. The high-speed transplanting mechanism of claim 1, wherein an angle scale plate is set on one side of the duckbill planting part.

9. A transplanter comprising:
a power input portion,
a rocker,
a planting power arm,
a drive shaft, wherein a first end of the drive shaft is connected to the power input portion, a second end of the drive shaft is fixed at an end of the rocker, and the other end of the rocker is hingedly associated with the planting power arm,
an angle-adjusting device for positioning an angle of a duckbill into soil, wherein the angle-adjusting device includes a rear arm, a front arm, a restoration spring, a control wire, a control wire sleeve, and a control adjuster comprising an adjuster body and a handle fixed on the adjuster body;

a duckbill planting portion, a unit for maintaining a pot seedling upright; and a mounting base of a planting device, wherein the mounting base of the planting device has an adjustable arm support shaft and a power arm support shaft;

wherein a first end of the planting power arm is hingedly associated with the duckbill planting portion, and the other end of the planting power arm is hingedly associated with the power arm support shaft on the mounting base of the planting device;

wherein a first control wire hole is located on a first limit plate, said first limit plate located on the rear arm;

wherein a second control wire hole is located on a second limit plate, said second limit plate located on the front arm;

wherein the front arm is hingedly associated with the adjustable arm support shaft, one end of the rear arm is hingedly associated with the duckbill planting portion, and a second end of the rear arm and the second end of the front arm are axially slidingly connected;

wherein the adjuster body is fixed on the mounting base or on the duckbill planting portion, and has a plurality of holes distributed in circumference thereabout;

wherein the mounting base or the duckbill planting portion is provided with a raised cylindrical platform embeddable into said plurality of holes; and wherein the restoration spring is positioned between the first and second limit plates, one end of the control wire fixed on the second limit plate, and the other end of the control wire passing through the first control wire hole, the restoration spring, the second control wire hole, and the control wire sleeve fixed on the adjuster body.

10. The transplanter of claim 9, wherein the angle-adjusting device drives the duckbill to incline in a direction opposite to the transplanter's drive direction, and the angle between ground and center line of the duckbill can be adjusted between 65°-85°.

11. The transplanter of claim 9, wherein an extension is set at one end of the rear arm and the front arm, and two extension parts connect by sliding fit.

12. The transplanter of claim 9, wherein a slide-adjusting groove is provided at one end of the rear arm connected to the front arm, a guide pin shaft at one end of the front arm connected to the rear arm, and the guide pin shaft is positioned within the slide-adjusting groove.

13. The transplanter of claim 12, wherein the extension portion of the front arm has a counter bore that corresponds to the section shape of the extension portion of the rear arm, the extension portion of the rear arm is inserted into the counter bore, and the two sides of the counter bore are sliding guide fit.

14. The transplanter of claim 13, wherein ball bearings are positioned between the extension portion of the rear arm and the counter bore.

15. The transplanter of claim 9, wherein the adjuster body comprises a scale.

16. The transplanter of claim 9, wherein an angle scale plate is positioned on one side of the duckbill planting portion.

* * * * *

UNITED STATES PATENT AND TRADEMARK OFFICE
CERTIFICATE OF CORRECTION

Page 1 of 1

PATENT NO. : 10,524,411 B2
APPLICATION NO. : 15/870097
DATED : January 7, 2020
INVENTOR(S) : Lili Dong, Lvhua Han and Zhen Wang It is certified that error appears in the above-identified patent and that said Letters Patent is hereby corrected as shown below:

In the Claims
Claim 1,    Column 8,    Line 16,    after "body;" insert --and--

Signed and Sealed this
Fifth Day of May, 2020

Andrei Iancu
*Director of the United States Patent and Trademark Office*